(12) United States Patent
Oka

(10) Patent No.: US 6,760,040 B2
(45) Date of Patent: Jul. 6, 2004

(54) IMAGE PROCESSING METHOD, IMAGE PROCESSING APPARATUS, SEMICONDUCTOR DEVICE, COMPUTER PROGRAM AND RECORDING MEDIUM

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 167 days.

(21) Appl. No.: 09/935,879

(22) Filed: Aug. 23, 2001

(65) Prior Publication Data

US 2002/0113804 A1 Aug. 22, 2002

(30) Foreign Application Priority Data

Aug. 24, 2000 (JP) .................................... 2000-254065
Aug. 16, 2001 (JP) .................................... 2001-247430

(51) Int. Cl.$^7$ ................................................. G09G 5/00
(52) U.S. Cl. .................... 345/644; 345/643; 345/645; 345/648; 345/427; 345/647
(58) Field of Search .................. 345/644, 643, 345/645, 646, 427, 648, 649, 660, 647

(56) References Cited

U.S. PATENT DOCUMENTS

| | | | | |
|---|---|---|---|---|
| 5,548,693 A | * | 8/1996 | Shinya | 345/473 |
| 5,943,057 A | * | 8/1999 | Ohba | 345/419 |
| 6,305,221 B1 | * | 10/2001 | Hutchings | 73/488 |
| 6,326,964 B1 | * | 12/2001 | Snyder et al. | 345/419 |
| 6,414,684 B1 | * | 7/2002 | Mochizuki et al. | 345/473 |
| 6,606,095 B1 | * | 8/2003 | Lengyel et al. | 345/473 |

* cited by examiner

Primary Examiner—Matthew Luu
Assistant Examiner—Daniel Chung
(74) Attorney, Agent, or Firm—Lerner, David, Littenberg, Krumholz & Mentlik, LLP

(57) ABSTRACT

A technique for expressing an elastic body using computer graphics. The elastic body is expressed by transforming coordinates of shape specific points which specify the shape of an object using a transformation matrix. Each element of the transformation matrix is expressed by a function having time as a variable which converges to a corresponding element of a matrix that represents the motion of the object when the object is assumed to be a rigid body. By substituting a predetermined time into this function, a value of each element of the transformation matrix is determined. The shape of the object is determined based on the coordinate values of the shape specific points after coordinate transformation.

5 Claims, 4 Drawing Sheets (a)                    (b)

IMAGE PROCESSING METHOD, IMAGE PROCESSING APPARATUS, SEMICONDUCTOR DEVICE, COMPUTER PROGRAM AND RECORDING MEDIUM

CROSS-REFERENCE TO RELATED APPLICATIONS

This application is based upon and claims the benefit of priorities from the prior Japanese Patent Applications No. 2000-254065 filed on Aug. 24, 2000 and No. 2001-247430 filed on Aug. 16, 2001, the entire contents of both of which are incorporated herein by reference.

BACKGROUND OF THE INVENTION

The present invention relates to a technology for expressing an object using computer graphics, etc., and more specifically, to an image processing technology for transforming coordinates of shape specific points which specify the shape of a graphic that represents an object, so as to express the behavior of the object such as motion and deformation.

Recent years have seen significant advances in the computer-graphics-related technology and the results of various computer-simulated events are now visually expressed through a display. For example, conducting a simulation on an object created by means of CAD (Computer Aided Design) and expressing the simulation result visually through computer graphics to check the behavior of the object such as motion and deformation constitutes an important step in design and development of a product.

Motion of an object, motion of a rigid body in particular, is expressed using the following transformation matrix (Equation 1). This transformation matrix is intended to transform coordinate values of a shape specific point P (X, Y, Z) for specifying the shape of a rigid body using a 4×4 transformation matrix and determine a transformed shape specific point P'(X', Y', z'). In this Specification, a "shape specific point" refers to a point for specifying the shape of an object such as a vertex.

$$\begin{pmatrix} X' \\ Y' \\ Z' \\ 1 \end{pmatrix} = \begin{pmatrix} R_{00} & R_{01} & R_{02} & R_{03} \\ R_{10} & R_{11} & R_{12} & R_{13} \\ R_{20} & R_{21} & R_{22} & R_{23} \\ 0 & 0 & 0 & 1 \end{pmatrix} \begin{pmatrix} X \\ Y \\ Z \\ 1 \end{pmatrix} \quad \text{[Equation 1]}$$

Of the above transformation matrix, the 3×3 matrix section with the 1st to 3rd rows and the 1st to 3rd columns represents a rotational displacement, while the 1×3 matrix section with the 4th column represents a translation. Since the 3×3 matrix section with the 1st to 3rd rows and the 1st to 3rd columns is a matrix that represents a rotational displacement, it satisfies the condition of the following Equation 2:

$$R = \begin{pmatrix} R_{00} & R_{01} & R_{02} \\ R_{10} & R_{11} & R_{12} \\ R_{20} & R_{21} & R_{22} \end{pmatrix} \quad \text{[Equation 2]}$$

$$R^{-1} = {}^t R$$

$$\det R = 1$$

Motion of a rigid body is expressed by computing the above-described transformation matrix for all shape specific points of the graphic that represents the object. In the case of a rigid body, a positional relationship such as a distance between a plurality of shape specific points of one object does not change. Therefore, it is also possible to determine coordinate values of other shape specific points from the positional relationship with the shape specific point P' determined by the Equation 1.

Here, since an object is represented by a three-dimensional graphic, the transformation matrix is set to be a 4×4 matrix. However, when an object is represented by a two-dimensional graphic, a similar transformation can be performed using a 3×3 matrix. In this case, Equation 2 is changed so as to hold for a 2×2 matrix with elements $R_{00}$, $R_{01}$, $R_{10}$ and $R_{11}$.

On the other hand, if the object is an elastic body, its motion is expressed by regarding the object as a model with a plurality of shape specific points for specifying the shape of a graphic that represents the object, mutually connected via a virtual spring. The elastic body is expressed by solving an equation of motion of a force of the spring acting on each shape specific point.

For example, in the case of a model with a shape specific point P connected to three neighboring shape specific points via three springs, suppose when the shape specific point P is regarded as a starting point, position vectors of the three neighboring shape specific points at time t are $v_0(t)$, $v_1(t)$ and $v_2(t)$, spring constants are $k_0$, $k_1$ and $k_2$ and natural lengths of the springs are $L_0$, $L_1$ and $L_2$. Then, a force F(t) that acts on the shape specific point P is expressed by the following Equation 3:

$$F(t) = k_0(|v_0(t)| - L_0) * \frac{v_0(t)}{|v_0(t)|} + \quad \text{[Equation 3]}$$
$$k_1(|v_1(t)| - L_1) * \frac{v_1(t)}{|v_1(t)|} + k_2(|v_2(t)| - L_2) * \frac{v_2(t)}{|v_2(t)|}$$

Suppose the shape specific point P is a mass point, the mass of the shape specific point P is M, the damping coefficient of vibration of spring is D, and the coordinate value of the shape specific point P at time t is P(t)=(x(t), y(t), z(t)). Then, the equation of motion of the shape specific point P is expressed by the following Equation 4:

$$M \frac{d^2}{dt^2} P(t) = F(t) - D \frac{d}{dt} P(t) \quad \text{[Equation 4]}$$

Solving this equation of motion allows the coordinate value P(t) of the shape specific point P at time t to be calculated. The elastic body is expressed by applying the above-described computation to all shape specific points of the graphic that represents the elastic body.

Such a coordinate transformation for expressing an elastic body requires computations of Equation 3 and Equation 4 to be carried out for all shape specific points that specify the shape of the graphic that expresses the elastic body. The load on the image processing apparatus that carries out such computations becomes enormous as the amount of computation is enormous. For this reason, in the case where it is necessary to display an elastic body in real time in a video game, etc., a high performance image processing apparatus is required. This is because if the performance of the image processing apparatus is low, its computation processing will not catch up with the motion of the elastic body, which causes the motion of the elastic body to appear unnatural.

However, high performance image processing apparatuses tend to be costly and cannot be used for apparatuses, such as home video game machines, which require high cost performance. Thus, there is a demand for a technology capable of expressing the behavior of an object in a quasi-natural manner while suppressing the load on the apparatus to a minimum.

SUMMARY OF THE INVENTION

Therefore, it is an object of the present invention to provide an image processing technology capable of expressing the behavior of an object such as displacement and deformation naturally while suppressing the load on the apparatus to a minimum.

According to one aspect of the present invention, there is provided an image processing method executed in an apparatus for transforming coordinates of shape specific points that specify a shape of a graphic representing an object so as to generate graphics data representing a behavior of the object, the method comprising the steps of: setting a transformation matrix having elements each of which is expressed by a function having time as a variable, the function converging to a corresponding element of a matrix that represents a behavior of the object when the object is assumed to be a rigid body; and transforming the coordinates of the shape specific points using the transformation matrix and generating the graphics data based on the coordinates obtained.

Conventionally, expressing the motion of an elastic body requires equations of motion to be solved for all shape specific points that specify the shape of the elastic body as described above. The present invention, however, makes it possible to express the behavior of the elastic body using a matrix like expressing the behavior of a rigid body in the conventional technique. Thus, the load on the apparatus is reduced significantly.

Since each element of the transformation matrix is expressed as a function having time as a variable, Equations 1 and 2 are not always satisfied. Therefore, the shape of an object specified by the shape specific points whose coordinates are transformed by this matrix does not always match the shape before the coordinate transformation, and as a result, the shape of the object changes thus expressing the behavior of the elastic body. Furthermore, each element of the transformation matrix converges to each element of the matrix that represents the behavior of the object when the object is assumed to be a rigid body and thus the object finally returns to its original shape, which means that the object has behaved in much the same way as the rigid body. That is, when an external force acts on the object, the object moves like an elastic body due to the external force and finally returns to the same position and takes the same shape as the behavior caused by the external force when the object is assumed to be a rigid body.

When the foregoing function of each element of the transformation matrix is set based on constants that represent physical characteristics of the object, the operation of the object becomes closer to natural behavior. This function is a solution $A_{ij}(t)$ to the following equation:

$$M_{ij}\frac{d^2}{dt^2}A_{ij}(t) = k_{ij}(A_{ij}(t) - R_{ij}) - D_{ij}\frac{d}{dt}A_{ij}(t)$$

wherein $M_{ij}$, $k_{ij}$, $D_{ij}$: the constants to define the physical characteristics of the object $A_{ij}$: the function that expresses an element at row i, column j of the transformation matrix $R_{ij}$: a value of an element at row i, column j of the matrix when the object is assumed to be a rigid body i: 0 to 3, j: 0 to 3 t: time.

This equation is a differential equation that corresponds to the equation of motion of a mass point by a spring used for expressing an elastic body in the conventional technique. By deriving a function Aij(t) that expresses each element of the transformation matrix from this differential equation, it is possible to express the motion of the elastic body, which, with a lapse of time t, ends up taking the shape when the object is assumed to be a rigid body while damping in vibration.

Conventionally, for expressing the behavior of an elastic body, it is necessary to solve as many equations of motion as the number of shape specific points. According to the present method, however, it is only necessary to solve as many differential equations as the number of elements of the transformation matrix. The number of elements of a matrix is 16 even when the object is expressed in a three-dimensional space. On the other hand, the number of shape specific points increases as the shape of the elastic body becomes more complicated. The more complicated the shape of the elastic body, or the greater the number of shape specific points, the greater the effect of the present invention becomes.

According to another aspect of the present invention, there is provided an image processing apparatus for transforming coordinates of shape specific points that specify a shape of a graphic representing an object so as to generate graphics data representing a behavior of the object, the apparatus comprising: means for generating a transformation matrix having elements each of which is expressed by a function having time as a variable, the function converging to a corresponding element of a matrix that represents a behavior of the object when the object is assumed to be a rigid body; and means for transforming the coordinates of the shape specific points using the transformation matrix and generating the graphics data based on the coordinates obtained.

It may be arranged that the image processing apparatus further comprises recording means for recording constants that represent physical characteristics of the object, wherein the means for generating the transformation matrix is configured to set an equation for each element of the transformation matrix based on the constants and derive the function from the equation.

According to another aspect of the present invention, there is provided a semiconductor device for transforming coordinates of shape specific points that specify a shape of a graphic representing an object so as to generate graphics data representing a behavior of the object, the semiconductor device comprising: means for generating a transformation matrix having elements each of which is expressed by a function having time as a variable, the function converging to a corresponding element of a matrix that represents a behavior of the object when the object is assumed to be a rigid body; and means for transforming the coordinates of the shape specific points using the transformation matrix and generating the graphics data based on the coordinates obtained.

Furthermore, the present invention can also be implemented by allowing a general-purpose computer of a game dedicated computer apparatus or home computer apparatus, etc. to load and execute a computer program recorded in a computer-readable recording medium.

Specifically, according to another aspect of the present invention, there is provided a recording medium recorded with a computer program for causing a computer to operate as an image processing apparatus for transforming coordinates of shape specific points that specify a shape of a graphic representing an object so as to generate graphics data representing a behavior of the object, the computer program causing the computer to execute the steps of: generating a transformation matrix having elements each of which is expressed by a function having a time as a variable, the function converging to a corresponding element of a matrix that represents a behavior of the object when the object is assumed to be a rigid body; and transforming the coordinates of the shape specific points using the transformation matrix and generating the graphics data based on the coordinates obtained.

BRIEF DESCRIPTION OF THE DRAWINGS

These objects and other objects and advantages of the present invention will become more apparent upon reading of the following detailed description and the accompanying drawings in which.

DETAILED DESCRIPTION

An embodiment of the present invention will be specifically described with reference to the accompanying drawings <Information Processing Apparatus>

Figure 1:
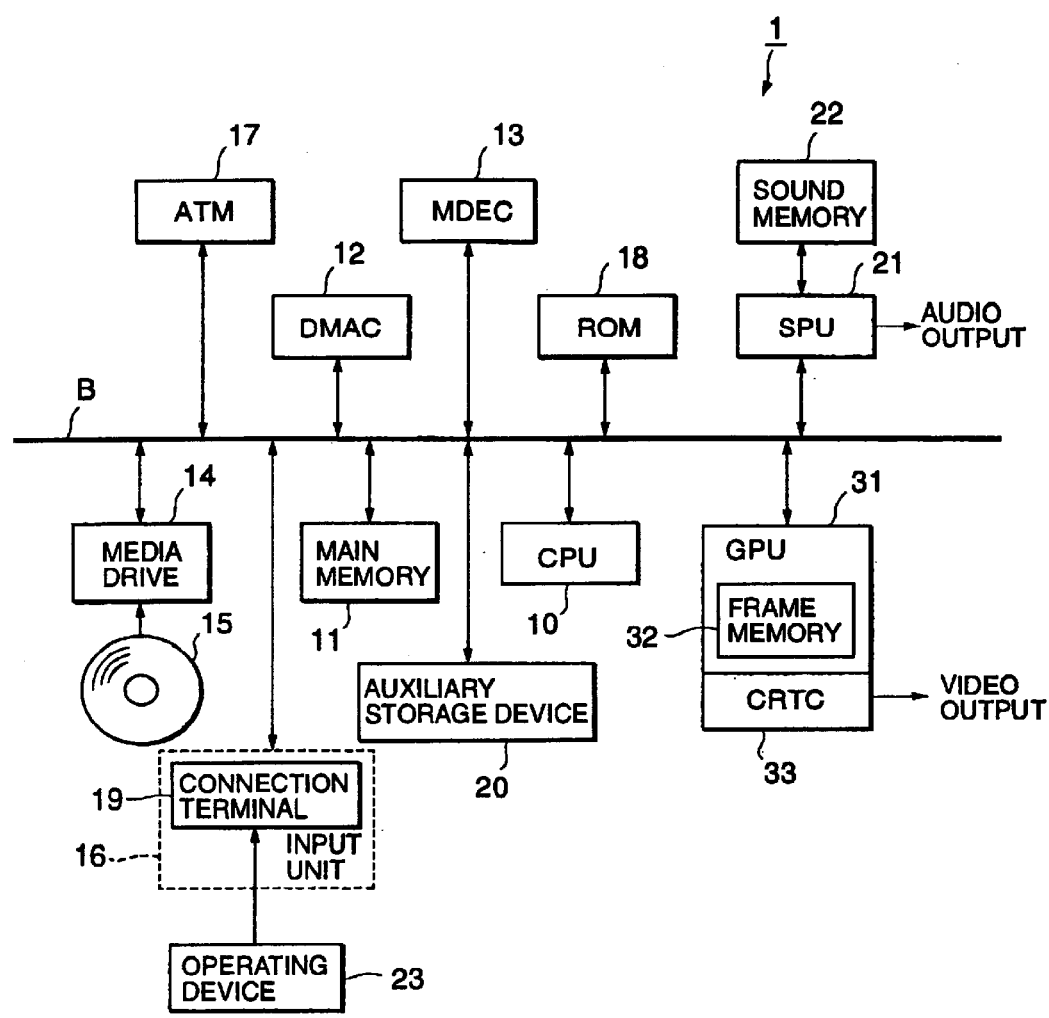
FIG. 1 is an internal block diagram of an information processing apparatus.

FIG. 1 is an internal block diagram of an information processing apparatus 1 to which the present invention is applied. This information processing apparatus 1 transforms coordinates of shape specific points specifying the shape of a graphic that represents an object, changes the position or shape of the object and shows the object on a display (not shown).

The information processing apparatus 1 includes a CPU 10, a main memory 11 made up of a RAM, a DMAC (direct memory access controller) 12, an MPEG (Motion Picture Experts Group) decoder (MDEC) 13, a media drive 14 for mounting a medium 15 such as a CD-ROM or DVD-ROM, an input unit 16, a communication controller (ATM) 17 for transmitting/receiving information with an external device via a network, a ROM 18 for storing a program such as BIOS, an auxiliary storage device 20 such as a hard disk, a sound processing unit (SPU) 21 for reading sound data stored in a sound memory 22 and outputting same as audio output, and a graphic processing unit (hereinafter referred to as a "GPU") 31 having a frame memory 32. The foregoing components are connected to one another via a bus B.

The GPU 31 is connected to a CRTC (CRT controller) 33 for generating a video output signal. This video output signal is generated in compliance with standards of NTSC and PAL, etc., and output from the CRTC 33 to a display (not shown).

The CPU 10 is a semiconductor device that loads a start program from the auxiliary storage device 20 at the startup of the information processing apparatus 1, executes the start program and operates an operating system. The CPU 10 also has the functions of controlling the media drive 14, reading an application program or data from the medium 15 mounted in this media drive 14 and storing this in the main memory 11. The CPU 10 further has the functions of applying geometry processing to various data read from the medium 15 and auxiliary storage device 20, for example, three-dimensional object data (coordinate values of vertices (shape specific points) of a polygon, etc.) made up of a plurality of graphic units (polygons) and generating a display list containing geometry-processed polygon definition information (specifications of the shape of polygon used, its formation position, and the type, color and texture, etc. of the material of the polygon).

The GPU 31 is a semiconductor device that has the functions of carrying out rendering processing using the display list notified from the CPU 10 and drawing polygons in the frame memory 32. The frame memory 32 can also use this as a texture memory. Thus, a pixel image in the frame memory can be pasted as texture to a polygon to be drawn.

The SPU 21 is a semiconductor device that synthesizes sound data read from the sound memory 22 into an audio output signal. The DMAC 12 is a semiconductor device that carries out DMA transfer control over the circuits connected to the bus B. The MDEC 13 is a semiconductor device that operates in parallel with the CPU 10 and has the function of expanding data compressed in MPEG (Motion Picture Experts Group) or JPEG (Joint Photographic Experts Group) systems, etc.

The input unit 16 is provided with a connection terminal 19 through which an input signal from an operating device 23 is input. The operating device 23 is provided with a plurality of operation buttons and allows the operator to move or deform a graphic shown on the display using these operation buttons in a variety of ways. <Configuration of Graphics Generation Apparatus>

A configuration example when the above-described information processing apparatus 1 is operated as the image processing apparatus of the present invention will be explained.

The image processing apparatus is implemented by the CPU 10 and GPU 31 of the information processing apparatus 1 loading and executing predetermined computer programs recorded in the auxiliary storage device 20, ROM 18, or other recording medium, such as medium 15. Here, coordinates of shape specific points for specifying the shape of a graphic that represents an object are transformed to express displacements or elastic motion of the object. In the present invention, coordinates of shape specific points are transformed using a transformation matrix.

Figure 2:
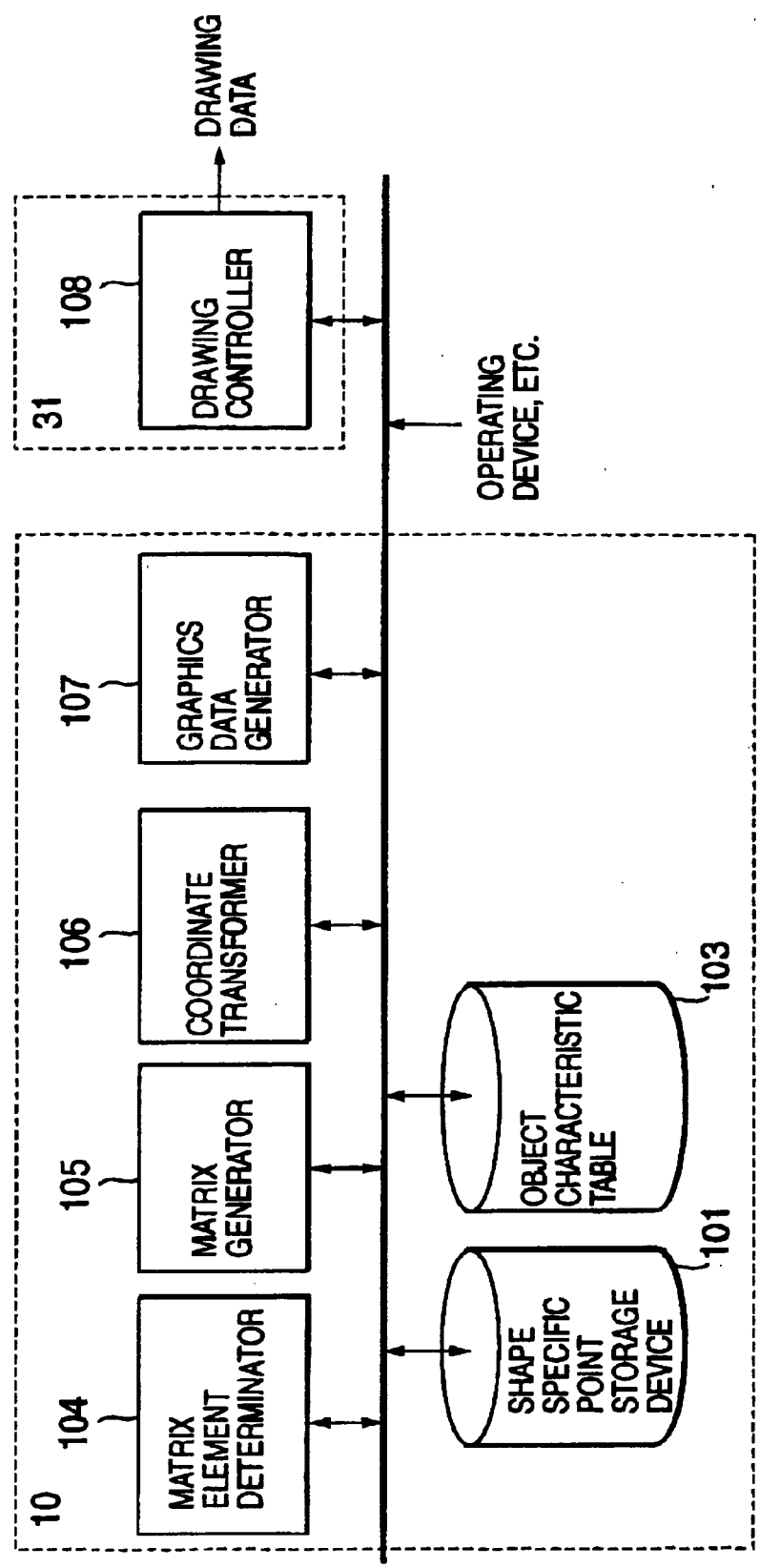
FIG. 2 is a functional block diagram concerning the present invention.

FIG. 2 is a functional block diagram of the information processing apparatus 1 when the information processing apparatus operates as the image processing apparatus. In this embodiment, the CPU 10 and computer program form functional blocks (modules) such as a matrix element determinator 104, a matrix generator 105, a coordinate transformer 106 and a graphics data generator 107 inside the CPU 10, and form a shape specific point storage device 101 and an object characteristic table 103 in a memory area (not shown) in the CPU 10.

Furthermore, the GPU 31 and computer program form a functional block (module) of the drawing control unit 108 in the GPU 31.

Then, the GPU 31 and computer program then transform coordinate values of shape specific points stored in the shape specific point storage device 101 and generate graphics data including the transformed coordinate values and the specification of information necessary for drawing of the graphic (drawing context). The coordinate values refer to coordinate values in a three-dimensional orthogonal coordinate system made up of the X-axis, Y-axis and Z-axis (each referred to as X coordinate value, Y coordinate value and Z coordinate value).

In relation to the above-described explanation of the information processing apparatus 1, a vertex of a polygon corresponds to a "shape specific point" and the display list corresponds to "graphics data".

Each element of a transformation matrix can be generated in any way as far as each element of the transformation matrix is expressed by a function that converges to a corresponding element of a matrix that represents the motion of an object when the object is assumed to be a rigid body.

This embodiment will explain an example of generating a function that expresses each element of a transformation matrix from a differential equation based on the equation of motion shown in the Equation 4 above.

The shape specific point storage device 101 stores coordinate values of a plurality of shape specific points to specify the shape of a graphic. The coordinate values stored are the coordinate values of shape specific points to specify the shape of a graphic at that point in time and are rewritten at any time when the coordinates change due to a displacement or deformation of the graphic.

The object characteristic table 103 stores constants $M_{ij}$, $k_{ij}$ and $D_{ij}$ that correspond to mass M of the mass point (shape specific point), spring constant k and damping coefficient D, respectively, in the Equations 3 and 4 that represent a conventional elastic body. The subscripts i and j denote the $i^{th}$ row and $j^{th}$ column of a transformation matrix. When there is a plurality of objects, constants are determined for every object.

These constants determine physical characteristics of the object. The inertia increases and deformation of the elastic body slows down as $M_{ij}$ corresponding to the mass M increases, while the frequency increases as $k_{ij}$ corresponding to the spring constant k increases and the function of the transformation matrix for each element which will be described later converges faster as $D_{ij}$ corresponding to the damping coefficient D increases.

The matrix element determinator 104 sets up a differential equation whose solution is a function having time t as a variable, based on the matrix that expresses the motion of the object when the object is assumed to be a rigid body and $M_{ij}$, $k_{ij}$ and $D_{ij}$ of the corresponding object read from the object characteristic table 103. Values of this function at time t become elements of the transformation matrix.

The matrix that expresses the motion of the object when the object is assumed to be a rigid body is a conventional matrix that expresses the motion of a rigid body as shown in Equation 1. This matrix is created according to a method similar to the conventional method from data of the motion of the object, data expressing physical phenomenon such as collision by other objects, etc. input from the operating device 23.

The matrix generator 105 finds a solution to the differential equation of each element of the transformation matrix set up by the matrix element determinator 104 and generates a transformation matrix using the solution obtained. The solution to the differential equation is a function having time t as a variable as described above and converges to a value of each corresponding element of the matrix that expresses the motion of the object when the object is assumed to be a rigid body. By substituting a time into this function, each element of the transformation matrix is determined.

The coordinate transformer 106 transforms coordinates of shape specific points using the transformation matrix generated by the matrix generator 105 and updates the coordinate values before transformation stored in the shape specific point storage device 101 with the coordinate values of the shape specific points after transformation.

The graphics data generator 107 determines the shape of the graphic based on the coordinates of the shape specific points transformed by the coordinate transformer 106 and generates the graphics data including the information that expresses the shape of this graphic. The graphics data is sent to the drawing controller 108.

The drawing controller 108 draws the graphic in the frame memory 32 at the time of input of the graphics data generated as shown above. Drawing is done by, for example, drawing a triangle or rectangle specified by a plurality of shape specific points using polygons. The data (drawing data) drawn in the frame memory 32 is sent to the display by the CRTC 33 as a video output signal.

<Operation of Image Processing Apparatus>

The information processing apparatus 1 in the above configuration provides an image that represents a graphic whose shape changes such as an elastic body using the following procedure.

Figure 3:
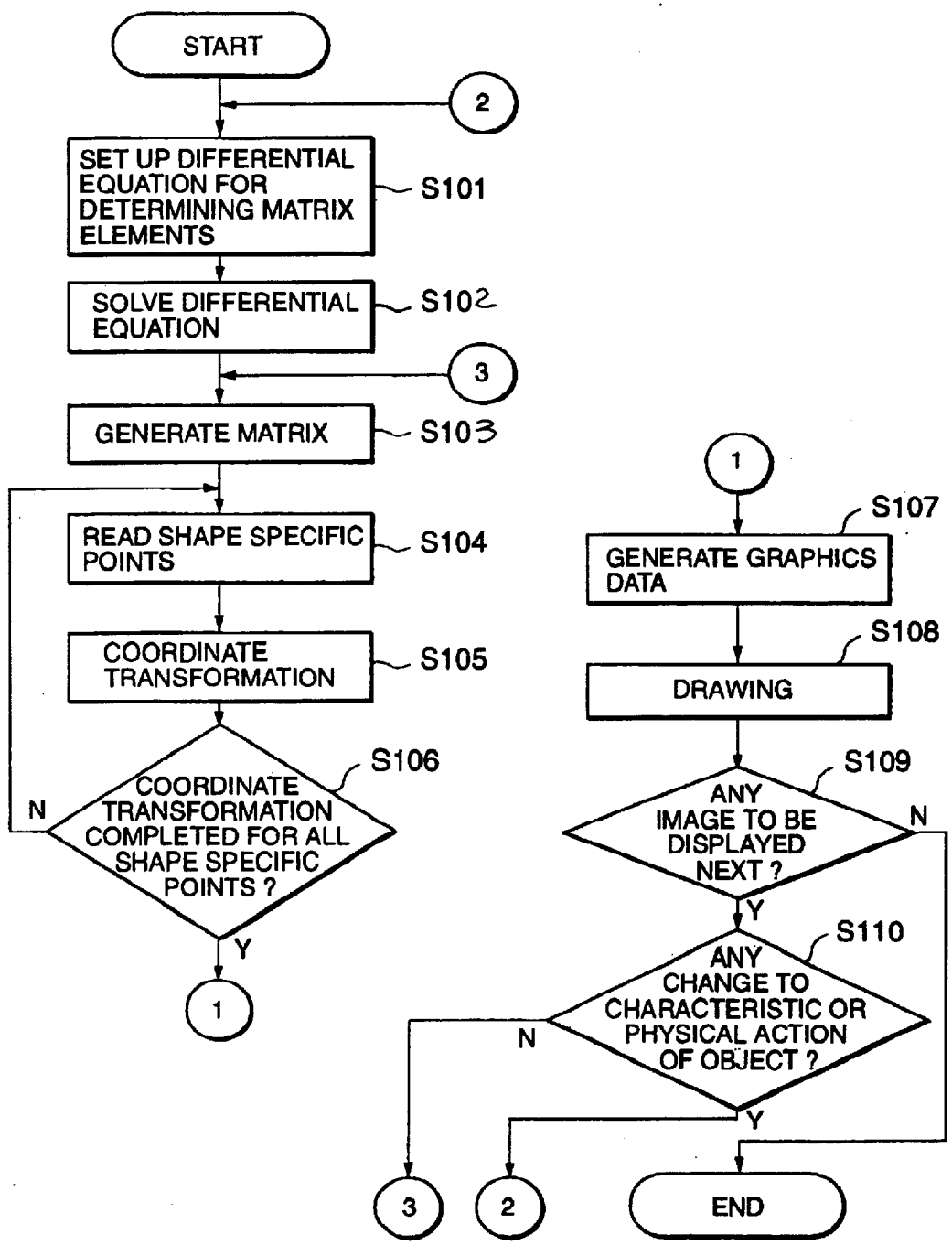
FIG. 3 is a flow chart showing a procedure for image processing.

FIG. 3 is a flow chart showing the procedure for this image processing.

The matrix element determinator 104 generates a matrix that represents the motion of an object when the object is assumed to be a rigid body, based on data from the operating device 23 and data that represents the physical action from other objects, and reads $M_{ij}$, $k_{ij}$ and $D_{ij}$ of the corresponding object from the object characteristic table 103. An element of a matrix that represents the motion of an object when the object is assumed to be a rigid body is expressed as $R_{ij}$. The matrix that represents the motion of the object when the object is assumed to be a rigid body is, for example, the transformation matrix shown in the Equation 1 above.

Based on $R_{ij}$, $M_{ij}$, $k_{ij}$ and $D_{ij}$, a differential equation is set up for each element of the transformation matrix used for coordinate transformation (step S101).

The format of the transformation matrix is set according to the coordinates to be transformed. For example, when the coordinates of a shape specific point consist of X, Y and Z coordinate values, the transformation matrix is a 4×4 matrix, and when the coordinates of a shape specific point consist of X and Y coordinate values, the transformation matrix is a 3×3 matrix. Here, suppose the coordinates of a shape specific point consist of X, Y and Z coordinate values and the transformation matrix is a 4×4 matrix. The differential equation is, for example, the one as shown in Equation 5. This differential equation corresponds to an equation of motion of the spring used to express a conventional elastic body, that is, the Equation 4 above.

$$M_{ij}\frac{d^2}{dt^2}A_{ij}(t) = k_{ij}(A_{ij}(t) - R_{ij}) - D_{ij}\frac{d}{dt}A_{ij}(t) \qquad \text{[Equation 5]}$$

wherein $A_{ij}$ is a function that expresses an element at row i, column j of a transformation matrix $R_{ij}$ is a value of an element at row i, column j of a matrix when an object is assumed to be a rigid body.

The matrix generator 105 derives a function of each element $A_{ij}$ of the transformation matrix by solving the differential equation set up by the matrix element determinator 104 (step S102).

The differential equation of Equation 5 is changed to a recurrence formula of time t, time t+dt and t+2dt, for example, and solved for every dt one by one starting from the initial value of $A_{ij}$ to calculate $A_{ij}$ (t). The function that expresses each element $A_{ij}$(t) of the transformation matrix is a function having time t as a variable and converges to the corresponding element $R_{ij}$, of the matrix that represents the motion of the object when the object is assumed to be a rigid body.

The following 4×4 transformation matrix is generated by substituting time t at that time into the function of each element $A_{ij}$(t) of the transformation matrix obtained as shown above (step S103).

$$\begin{pmatrix} A_{00}(t) & A_{01}(t) & A_{02}(t) & A_{03}(t) \\ A_{10}(t) & A_{11}(t) & A_{12}(t) & A_{13}(t) \\ A_{20}(t) & A_{21}(t) & A_{22}(t) & A_{23}(t) \\ A_{30}(t) & A_{31}(t) & A_{32}(t) & A_{33}(t) \end{pmatrix}$$ [Equation 6]

The coordinate transformer 106 reads coordinate values of a shape specific point for specifying the shape of the graphic that represents the object subject to coordinate transformation, from the shape specific point storage device 101 (step S104).

The coordinate transformer 106 transforms the read coordinate values of the shape specific point using the transformation matrix generated by the matrix generator 105 (step S105). The transformed matrix is expressed by Equation 7 below. Here, (X, Y, Z, 1) and (X', Y', Z', 1) denote the coordinate values of the shape specific point before and after transformation, respectively.

$$\begin{pmatrix} X' \\ Y' \\ Z' \\ 1 \end{pmatrix} = \begin{pmatrix} A_{00}(t) & A_{01}(t) & A_{02}(t) & A_{03}(t) \\ A_{10}(t) & A_{11}(t) & A_{12}(t) & A_{13}(t) \\ A_{20}(t) & A_{21}(t) & A_{22}(t) & A_{23}(t) \\ A_{30}(t) & A_{31}(t) & A_{32}(t) & A_{33}(t) \end{pmatrix} \begin{pmatrix} X \\ Y \\ Z \\ 1 \end{pmatrix}$$ [Equation 7]

By repeating step S104 and step S105, the coordinate transformation by the Equation 7 is applied for coordinate values of all shape specific points for specifying the shape of the graphic that represents the object (step S106). The coordinate values of the shape specific points after coordinate transformation are stored in the shape specific point storage device 101.

After the transformed X, Y and Z coordinate values are determined for the coordinate values of all shape specific points, the graphics data generator 107 generates graphics data about the graphic that represents the object whose shape has changed, from the X, Y and Z coordinate values of the shape specific points after the transformation (step S107).

The graphics data generated is drawn in the frame memory 32 by the drawing controller 108 (step S108). The data drawn in the frame memory 32 is then sent to the CRTC 33, converted to a video output signal and displayed on a predetermined display. The shape of the object displayed is the one deformed from the original shape of the object by the transformation matrix of Equation 6.

When the display of the object after coordinate transformation is finished, it is determined whether there is any image to be displayed next or not (step S109). If there is no image to be displayed next (step S109: N), that is, when the program for expressing the image is finished or by an instruction for closing by the operating device 23, the image processing operation is finished.

When there is an image to be displayed next (step S109: Y), it is checked whether there is any change to the data representing a physical action or $M_{ij}$, $k_{ij}$ and $D_{ij}$ of the object (step S110). If there is a change (step S110: Y), the routine returns to step S101, where a new differential equation is set up and a transformation matrix is generated. When there is no change (step S110: N), the routine returns to step S103, where each element at the next timing is determined by substituting time t+Δt into each element $A_{ij}$(t) of the transformation matrix which is already determined.

Figure 4:
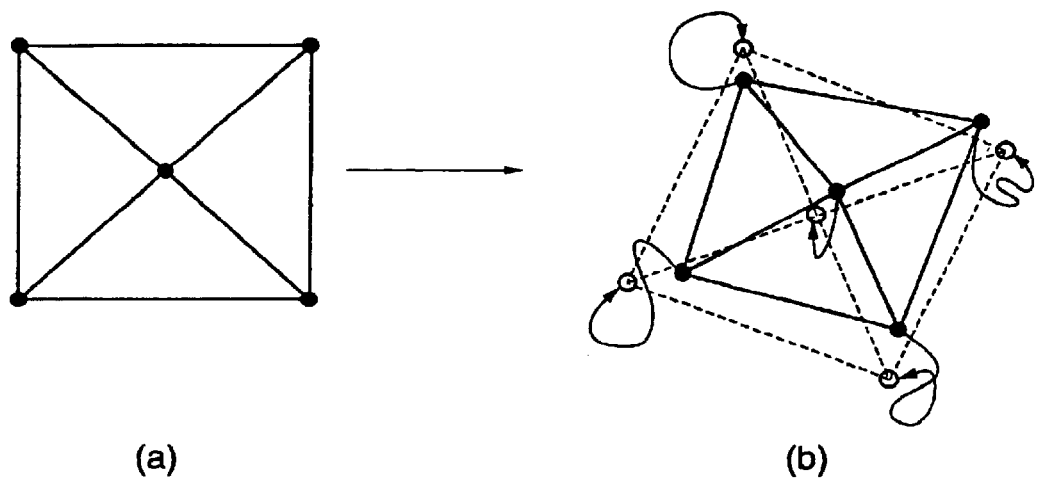
FIG. 4 illustrates the motion of an object, wherein (a) represents a graphic before coordinate transformation and (b) represents a graphic after coordinate transformation.

FIG. 4 is an illustration of the motion of an object expressed by the above-described coordinate transformation. In FIG. 4, (a) shows a graphic that represents the object before coordinate transformation. The shape of the graphic before transformation is a square and the shape specific points expressed with "●" show the vertices of the square and center point of the vertices. In FIG. 4, (b) shows a graphic after coordinate transformation. The shape of the graphic after transformation has the shape specified by the shape specific points expressed with "●". The shape specific points displace on the lines indicated by arrows with a lapse of time t and are positioned at points expressed with "○". By the shape specific points displacing with a lapse of time t, the shape of the graphic that expresses the object can be expressed as an elastic body.

The explanations above describe coordinate transformation about the three-dimensional graphic, but coordinate transformation is performed on the two-dimensional graphic in the same way. In this case, the transformation matrix is expressed with a 3×3 matrix and coordinate transformation is performed according to the Equation 8 below:

$$\begin{pmatrix} X' \\ Y' \\ 1 \end{pmatrix} = \begin{pmatrix} A_{00}(t) & A_{01}(t) & A_{02}(t) \\ A_{10}(t) & A_{11}(t) & A_{12}(t) \\ A_{20}(t) & A_{21}(t) & A_{22}(t) \end{pmatrix} \begin{pmatrix} X \\ Y \\ 1 \end{pmatrix}$$

By expressing each element of the transformation matrix using an equation of motion that represents the motion of a spring, the motion of the object represented by the graphic can be expressed naturally as an elastic body.

Furthermore, in the case of a conventional elastic body, it is necessary to solve equations of motion for all shape specific points of a graphic that represents the object. The present invention only needs to solve the same number of equations of motion as elements of a transformation matrix, and can thereby reduce the load on the apparatus.

That is, if a function $A_{ij}$(t) whose variable is a time is derived from the differential equation shown in Equation 5 for each element of the transformation matrix, then it is possible to determine the value of each element $A_{ij}$ of the transformation matrix by substituting time t into the function $A_{ij}$ (t). Once the transformation matrix is determined, it is possible to transform coordinates of the shape specific points using the transformation matrix, which eliminates the need for complicated calculations for coordinate transformation. This reduces the amount of calculation significantly compared to the conventional method that requires equations of motion to be solved for all shape specific points and makes it possible to reduce the load on the apparatus.

Furthermore, the above-described image processing apparatus can also be implemented by allowing a predetermined computer apparatus to load a computer program recorded in the recording medium according to the present invention. The above-described image processing apparatus can also be implemented by executing it in coordination with the operating system of the relevant computer apparatus or other computer programs in the apparatus.

As is apparent from the foregoing explanations, the present invention applies a function having time as a variable to each element of a matrix that expresses the behavior of an object and transforms coordinates of shape specific points for specifying the shape of a graphic that expresses the object while changing each element of the matrix with time, and therefore eliminates the need for complicated calculations if only a function for expressing each element of the matrix is provided, and can thereby reduce the load upon image processing.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An image processing method executed in an apparatus for transforming coordinates of shape specific points that specify a shape of a graphic representing an object so as to generate graphics data representing a behavior of said object, said method comprising the steps of:

setting a transformation matrix having elements each of which is expressed by a solution to the equation:

$$M_{ij}\frac{d^2}{dt^2}A_{ij}(t) = k_{ij}(A_{ij}(t) - R_{ij}) - D_{ij}\frac{d}{dt}A_{ij}(t)$$

wherein $M_{ij}$, $k_{ij}$, $D_{ij}$ are constants defining physical characteristics of the object, $A_{ij}$ is a function that expresses an element at row i, column j of the transformation matrix, $R_{ij}$ is a value of an element at row i, column j of the matrix when the object is assumed to be a rigid body, $0<i<3$, $0<j<3$, and t is time; and transforming the coordinates of said shape specific points said transformation matrix and generating said graphics data based on the coordinates obtained.

2. An image processing apparatus for transforming coordinates of shape specific points that specify a shape of a graphic representing an object so as to generate graphics data representing a behavior of said object, said apparatus comprising:

means for generating a transformation matrix having elements each of which is expressed by a solution to the equation:

$$M_{ij}\frac{d^2}{dt^2}A_{ij}(t) = k_{ij}(A_{ij}(t) - R_{ij}) - D_{ij}\frac{d}{dt}A_{ij}(t)$$

wherein $M_{ij}$, $k_{ij}$, $D_{ij}$ are constants defining physical characteristics of the object, $A_{ij}$ is a function that expresses an element at row i, column j of the transformation matrix, $R_{ij}$ is a value of an element at row i, column j of the matrix when the object is assumed to be a rigid body, $0<i<3$, $0<j<3$, and t is time; and means for transforming the coordinates of said shape specific points using said transformation matrix and generating said graphics data based on the coordinates obtained.

3. The image processing apparatus according to claim 2, further comprising recording means for recording constants that represent physical characteristics of said object, wherein said means for generating said transformation matrix is configured to set said equation for each element of said transformation matrix based on said constants.

4. A semiconductor device for transforming coordinates of shape specific points that specify a shape of a graphic representing an object so as to generate graphics data representing a behavior of said object, said semiconductor device comprising:

means for generating a transformation matrix having elements each of which is expressed by a solution to the equation:

$$M_{ij}\frac{d^2}{dt^2}A_{ij}(t) = k_{ij}(A_{ij}(t) - R_{ij}) - D_{ij}\frac{d}{dt}A_{ij}(t)$$

wherein $M_{ij}$, $k_{ij}$, $D_{ij}$ are constants defining physical characteristics of the object, $A_{ij}$ is a function that expresses an element at row i, column j of the transformation matrix, $R_{ij}$ is a value of an element at row i, column j of the matrix when the object is assumed to be a rigid body, $0<i<3$, $0<j<3$, and t is time; and means for transforming the coordinates of said shape specific points using said transformation matrix and generating said graphics data based on the coordinates obtained.

5. A recording medium recorded with a computer program for causing a computer to operate as an image processing apparatus for transforming coordinates of shape specific points that specify a shape of a graphic representing an object so as to generate graphics data representing a behavior of said object, said computer program causing the computer to execute a process comprising:

generating a transformation matrix having elements each of which is expressed by a solution to the equation:

$$M_{ij}\frac{d^2}{dt^2}A_{ij}(t) = k_{ij}(A_{ij}(t) - R_{ij}) - D_{ij}\frac{d}{dt}A_{ij}(t)$$

wherein $M_{ij}$, $k_{ij}$, $D_{ij}$ are constants defining physical characteristics of the object, $A_{ij}$ is a function that expresses an element at row i, column j of the transformation matrix, $R_{ij}$, is a value of an element at row i, column j of the matrix when the object is assumed to be a rigid body, $0<i<3$, $0<j<3$, and t is time; and transforming the coordinates of said shape specific points using said transformation matrix and generating said graphics data based on the coordinates obtained.

* * * * *

UNITED STATES PATENT AND TRADEMARK OFFICE
CERTIFICATE OF CORRECTION

PATENT NO.    : 6,760,040 B2
DATED         : July 6, 2004
INVENTOR(S)   : Masaaki Oka It is certified that error appears in the above-identified patent and that said Letters Patent is hereby corrected as shown below:

Column 1,
Line 38, "(X', Y', z')" should read -- (X', Y', Z') --.

Column 2,
Line 28, "$L_1$" should read -- $L_1$ --.

Column 11,
Line 40, before "said" (first occurrence) insert -- using --.

Signed and Sealed this

Twelfth Day of October, 2004

JON W. DUDAS
*Director of the United States Patent and Trademark Office*